US012071514B2

(12) United States Patent
Gaan et al.

(10) Patent No.: US 12,071,514 B2
(45) Date of Patent: Aug. 27, 2024

(54) PHOSPHORUS CONTAINING OLIGOMERS AND POLYMERS

(71) Applicant: EMPA Eidgenoessische Materialpruefungs- und Forschungsanstalt, Duebendorf (CH)

(72) Inventors: Sabyasachi Gaan, Gossau (CH); Rudolf Hufenus, St. Gallen (CH); Rashid Nazir, St. Gallen (CH); Pietro Simonetti, Teufen (CH); Khalifah Salmeia, St. Gallen (CH); Dambarudhar Parida, St. Gallen (CH); Ali Gooneie, St. Gallen (CH)

(73) Assignee: EMPA Eidgenoessische Materialpruefungs- und Forschungsanstalt, Duebendorf (CH)

( * ) Notice: Subject to any disclaimer, the term of this patent is extended or adjusted under 35 U.S.C. 154(b) by 771 days.

(21) Appl. No.: 17/055,586

(22) PCT Filed: May 20, 2019

(86) PCT No.: PCT/EP2019/063001
§ 371 (c)(1),
(2) Date: Nov. 15, 2020

(87) PCT Pub. No.: WO2019/219977
PCT Pub. Date: Nov. 21, 2019

(65) Prior Publication Data
US 2021/0371591 A1 Dec. 2, 2021

(30) Foreign Application Priority Data
May 18, 2018 (EP) .................................... 18173380

(51) Int. Cl.
*C08G 73/06* (2006.01)
*C07F 9/6558* (2006.01)
*C07F 9/6561* (2006.01)

(52) U.S. Cl.
CPC ...... *C08G 73/0633* (2013.01); *C07F 9/65583* (2013.01); *C07F 9/6561* (2013.01);
(Continued)

(58) Field of Classification Search
CPC ............ C08G 73/0633; C08G 73/0644; C08G 73/065; C08G 2210/00; C07F 9/65583;
(Continued)

(56) References Cited

U.S. PATENT DOCUMENTS 3,312,674 A 4/1967 Welch
3,931,196 A * 1/1976 Swan .................. C07F 9/65685
987/363

FOREIGN PATENT DOCUMENTS

CA 835488 A 2/1970
RU 2015140091 A 3/2017
RU 2632816 C2 10/2017

OTHER PUBLICATIONS

Yoshio Imai et al, "Synthesis of polysulfone-amines by polyaddition of piperazines to divinyl sulfone", Journal of Polymer Science, Polymer Chemistry Edition., vol. 19, No. 11 (Nov. 1, 1981), p. 3031-3034.
(Continued)

*Primary Examiner* — Shane Fang
(74) *Attorney, Agent, or Firm* — Agris & von Natzmer LLP; Joyce von Natzmer

(57) ABSTRACT

The present invention exploits reactive organophosphorus compounds containing unsaturated vinyl groups, which can be used in a flexible and highly controlled manner to prepare various macromolecular derivatives either via radical reac-
(Continued)

tions or via Michael addition with suitable nucleophiles. Based on the fact that secondary amine groups on the one hand and vinyl groups on the other hand can work as mutual linking sites, an arsenal of novel and useful addition products can be built up. By selecting the number of secondary amine sites and vinyl sites of the participating reaction partners, very different addition products can be formed. In particular, one can form either linear chain type macromolecules (i.e. linear oligomers or polymers) or highly cross-linked network polymers.

14 Claims, 1 Drawing Sheet

(52) U.S. Cl.
CPC ....... *C08G 73/0644* (2013.01); *C08G 73/065* (2013.01); *C08G 2210/00* (2013.01)

(58) Field of Classification Search
CPC .... C07F 9/6561; C08L 85/02; H01L 51/0067; H01L 51/0072
See application file for complete search history.

(56) References Cited

OTHER PUBLICATIONS

Written Opinion issued of PCT/EP2019/063001 on Sep. 23, 2019.

* cited by examiner

PHOSPHORUS CONTAINING OLIGOMERS AND POLYMERS

CROSS-REFERENCE TO RELATED APPLICATIONS

This is the U.S. national stage of International application no. PCT/EP2019/063001, filed May 20, 2019 designating the United States and claiming priority to European application no. EP 18173380.9, filed May 18, 2018, which are herewith incorporated by reference.

TECHNICAL FIELD OF THE INVENTION

The present invention relates to novel phosphorus containing oligomers and polymers, to methods or preparing the same and to a phosphorus containing hydrogel or organogel.

BACKGROUND OF THE INVENTION

Polyamides (notably polyamide 6 or "PA6") and Polyesters (PET) are commonly used in manufacturing textile fibers. Such polymers need to be flame retarded for fire safe application. The flame-retardancy of such polymers is either achieved by incorporating a flame-retardant moiety in the backbone of the polymer (copolymerization) or by incorporating a non-reactive additive during their thermal processing. Incorporation of an additive in the polymer during polymer processing offers the advantage of flexibility and simplicity. However, such non-reactive additives will leach out during their subsequent wet processing, especially during dyeing of textile fibers at temperatures greater than 100° C. Two possible ways to avoid such issues would be to either graft the reactive additive to the back bone of the polymer chain during thermal processing or to create non-leaching macromolecular additives during thermal processing of the polymer. Chemically grafting of additives to the polymer backbone would prevent their leaching during their subsequent wet treatments, whereas additives in macromolecular form will entangle with the polymer chain and thus will be prevented from migrating out of the polymer during subsequent after treatments. These two ways to render polymers flame retardant are rather novel and not much is known in the literature. Only limited knowledge exists regarding reactive extrusion of PA6 for improving its flame retardancy and thermal stability.

Reactive hindered phenols are efficient thermal stabilizers which could trap RO and ROO radicals to suppress aging process by donating hydrogen atoms and forming stable free radicals. Such phenols might be grafted onto the backbones of PA6 in a reactive extrusion process with high grafting efficiency in order to improve thermal oxidative stability [1]. In situ preparation of melamine cyanurate-PA6 nanocomposite from reaction of melamine and cyanuric acid in the extrusion process [2] is an efficient and innovative method to improve the flame retardancy of the polymer; however, such polymer formulations cannot be spun into textile fibers. Melamine cyanurate thus formed in situ will agglomerate to form large particles which could get clogged in a normal spinning process.

Reactive extrusion in form of chain extension has been widely used for the modification of polymers such as PA-6 and PET, and it is possible to increase the molecular weight of these polymers by reactive extrusion adding a chain extender to the extrusion process. The most commonly used chain extenders are 1,1'isophthaloyl-bis-caprolactam and 2,2'-bis(2-oxazoline) for PA-6 [3, 4], and pyromellitic dianhydride and triglycidyl isocyanurate for PET [5]. In these cases, however, no flame retardancy has been achieved.

Recently, water-insoluble and water-swellable gels are attracting an increasing interest in a wide range of biomedical applications such as in the pharmaceutical field as carriers for delivery of various drugs, peptides, and proteins. Their reversible swelling ability enables them to modulate the release behavior according to the external stimuli such as pH, temperature, ionic strength, electric field, or specific analyte concentration gradients.[6-10]. A number of methods have been developed for preparation of cross-linked polymeric gels, such as radicals initiation generated via thermal energy [11] or the photo-cleavage of initiator molecules [12], and "Click" chemistry [13], but the applications of above methods are limited because of the toxicity of used catalyst or initiator and the complicated chemical synthesis makes them still a significant challenge.

REFERENCES

1. Shi, K., L. Ye, and G. Li, *In situ stabilization of polyamide 6 with reactive antioxidant.* J. Therm. Anal. Calorim., 2015. 119(3): p. 1747-1757.
2. Chen, Y., et al., *Preparation of flame retardant polyamide 6 composite with melamine cyanurate nanoparticles in situ formed in extrusion process.* Polym. Degrad. Stab., 2006. 91(11): p. 2632-2643.
3. Xu, M., T. Liu, and C. B. Park. *Chain extension of polyamide 6 using multifunctional chain extenders and reactive extrusion for melt foaming.* 2018. American Chemical Society.
4. Lu, C., et al., *Chemical modification of polyamide-6 by chain extension with 2,2'-bis(2-oxazoline).* J. Polym. Sci., Part B: Polym. Phys., 2007. 45(15): p. 1976-1982.
5. Yan, H., et al., *Modification of poly(ethylene terephthalate) by combination of reactive extrusion and followed solid-state polycondensation for melt foaming.* J. Appl. Polym. Sci., 2015. 132(44): p. n/a.
6. Sa-Lima, H., et al., *Stimuli-responsive chitosan-starch injectable hydrogels combined with encapsulated adipose-derived stromal cells for articular cartilage regeneration.* Soft Matter, 2010. 6(20): p. 5184-5195.
7. Bhattarai, N., J. Gunn, and M. Zhang, *Chitosan-based hydrogels for controlled, localized drug delivery.* Advanced Drug Delivery Reviews, 2010. 62(1): p. 83-99.
8. Ballios, B. G., et al., *A hydrogel-based stem cell delivery system to treat retinal degenerative diseases.* Biomaterials, 2010. 31(9): p. 2555-2564.
9. Tan, H., et al., *Thermosensitive injectable hyaluronic acid hydrogel for adipose tissue engineering.* Biomaterials, 2009. 30(36): p. 6844-6853.
10. Kraehenbuehl, T. P., et al., *Cell-responsive hydrogel for encapsulation of vascular cells.* Biomaterials, 2009. 30(26): p. 4318-4324.
11. Lee, S. H., et al., *Rapid Formation of Acrylated Microstructures by Microwave-Induced Thermal Crosslinking.* Macromolecular Rapid Communications, 2009. 30(16): p. 1382-1386.
12. Hou, Y., et al., *Photo-Cross-Linked PDMSstar-PEG Hydrogels: Synthesis, Characterization, and Potential Application for Tissue Engineering Scaffolds.* Biomacromolecules, 2010. 11(3): p. 648-656.
13. van Dijk, M., et al., *Synthesis and Characterization of Enzymatically Biodegradable PEG and Peptide-Based*

Hydrogels Prepared by Click Chemistry. Biomacromolecules, 2010. 11(6): p. 1608-1614.

SUMMARY OF THE INVENTION

The inventors have discovered that reactive organophosphorus compounds containing unsaturated vinyl groups can be used in a flexible and highly controlled manner to prepare various macromolecular derivatives either via radical reactions or via Michael addition with suitable nucleophiles. Based on the fact that secondary amine groups on the one hand and vinyl groups on the other hand can work as mutual linking sites, an arsenal of novel and useful addition products can be built up. As will be appreciated from the various aspects outlined below, selecting the number of secondary amine sites and vinyl sites of the participating reaction partners allows one to generate very different addition products. In particular, one can form either linear chain type macromolecules (i.e. linear oligomers or polymers) or highly crosslinked network polymers.

Therefore, according to one aspect of the invention, there is provided a phosphorus containing linear oligomer or polymer with general formula (A)

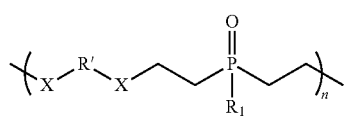

(A)

wherein n is at least 2;

$R_1$ is selected from the group consisting of phenyl, substituted phenyl, benzyl, substituted benzyl, a linear or branched alkyl group with up to 5 carbon atoms, and a linear or branched alkoxy group with up to 5 carbon atoms;

—X—R'—X— is selected from the group consisting of

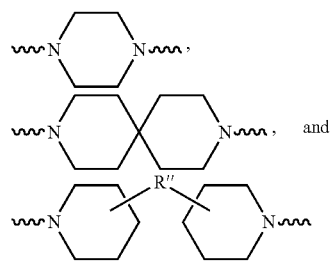

wherein R" is a linear or branched alkyl group with up to 5 carbon atoms in ortho, meta or para position, or —X—R'—X— is —$NR_2$—R'''—$NR_2$— wherein $R_2$ is a methyl or alkyl group and R''' is selected from the group consisting of:

a linear or branched alkyl group with up to 5 carbon atoms,

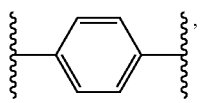

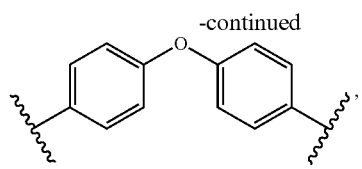

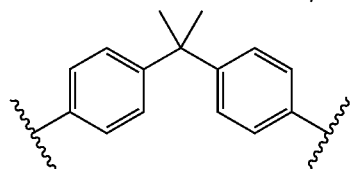

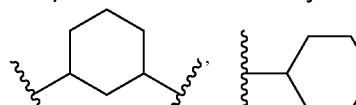

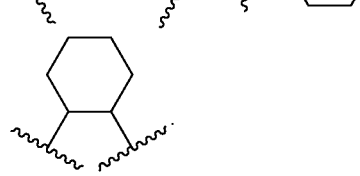

According to another aspect of the invention, a method of preparing a phosphorus containing oligomer or polymer (A) as defined above, comprises an addition reaction of a divinyl posphine oxide (B)

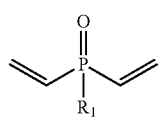

(B)

and an amine compound (C) containing two secondary amine groups according to

H—X—R'—X—H (C).

wherein —X—R'—X— is as defined just hereinabove.

According to a further aspect of the invention, there is provided a phosphorus containing cross-linked network polymer of general formula (D)

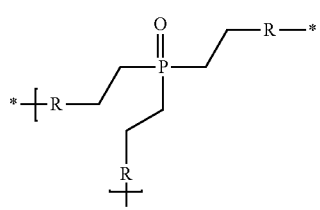

(D)

wherein R is selected from the group consisting of

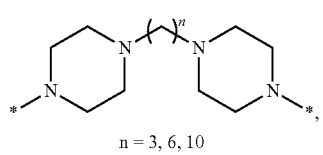

n = 3, 6, 10

-continued

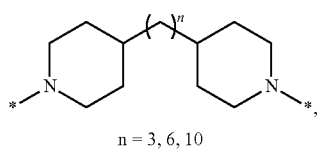
n = 3, 6, 10

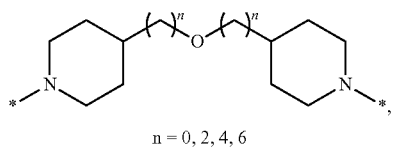
n = 0, 2, 4, 6

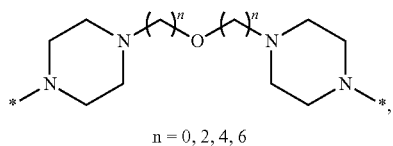
n = 0, 2, 4, 6

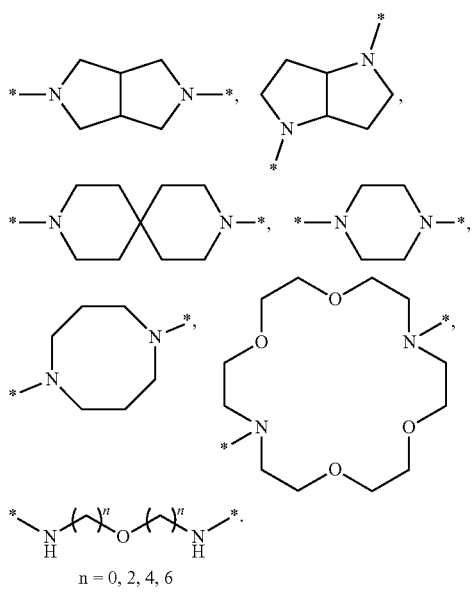

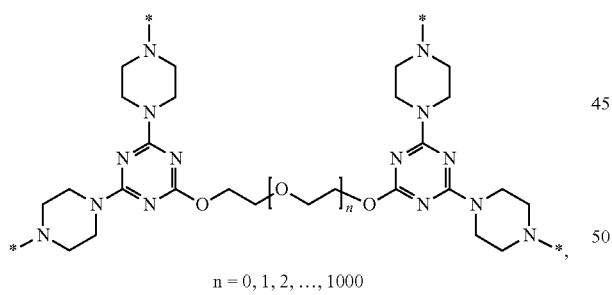
n = 0, 2, 4, 6

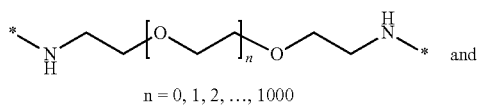
n = 0, 1, 2, ..., 1000

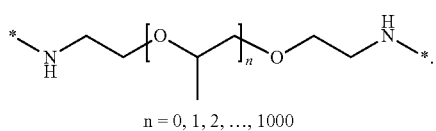 and
n = 0, 1, 2, ..., 1000

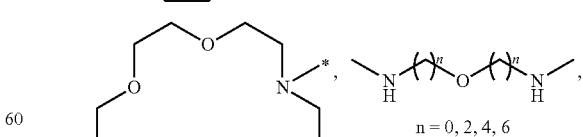
n = 0, 1, 2, ..., 1000

According to a still further aspect of the invention, a method of preparing a cross-linked network polymer (D) as defined above comprises an addition reaction of trivinyl posphine oxide (E)

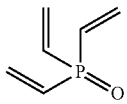 (E)

and an amine compound (F) containing two secondary amine groups according to

H—N—R—N—H (F)

wherein —N—R—N— is selected from the group consisting of

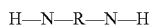

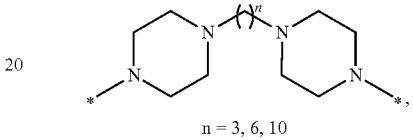
n = 3, 6, 10

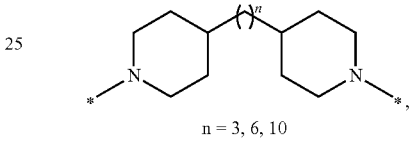
n = 3, 6, 10

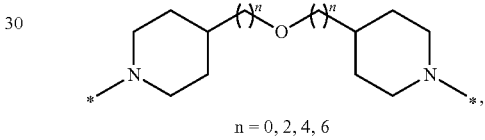
n = 0, 2, 4, 6

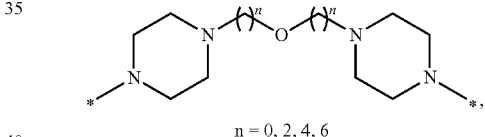
n = 0, 2, 4, 6

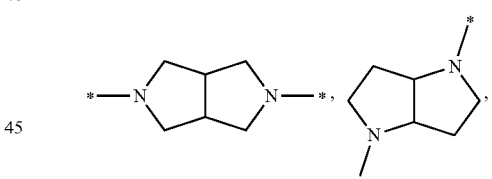

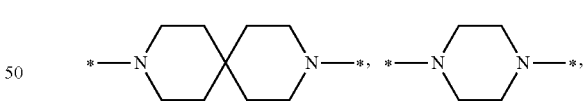

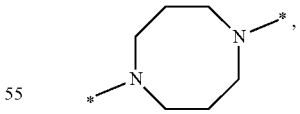
n = 0, 2, 4, 6

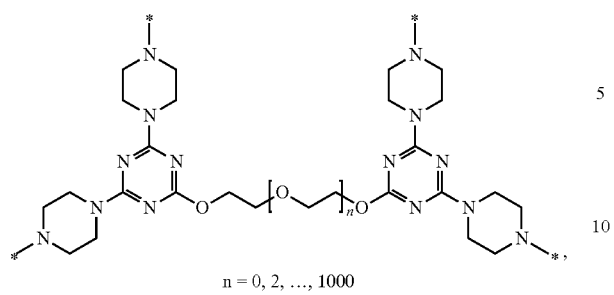

n = 0, 2, ..., 1000

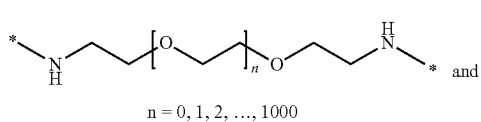 and n = 0, 1, 2, ..., 1000

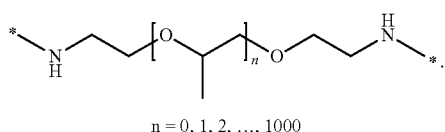

n = 0, 1, 2, ..., 1000

According to a still further aspect of the invention, there is provided a phosphorus containing cross-linked network polymer of general formula (G)

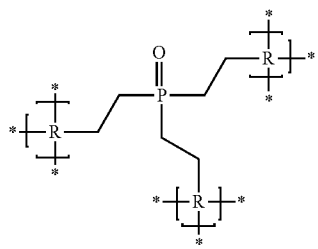
(G)

wherein R is selected from the group consisting of

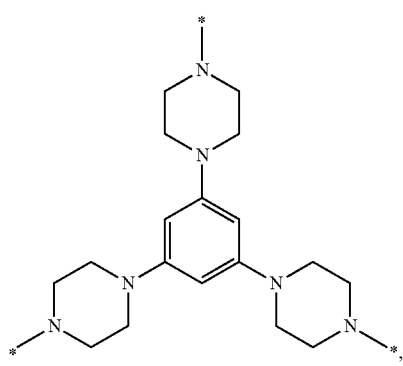

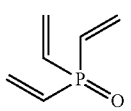

According to yet another aspect of the invention, a method of preparing a cross-linked network polymer (G) as defined above comprises an addition reaction of trivinyl posphine oxide (E)

(E)

and an amine compound (H) containing three secondary amine groups according to

—HN—R(NH—)—NH— (H)

wherein —N—R(N—)—N— is selected from the group consisting of

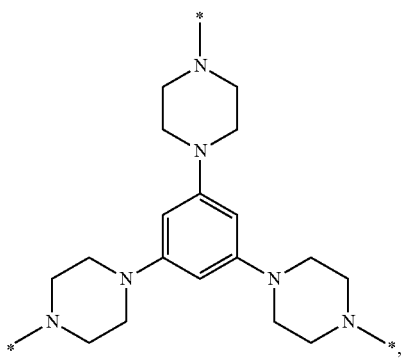
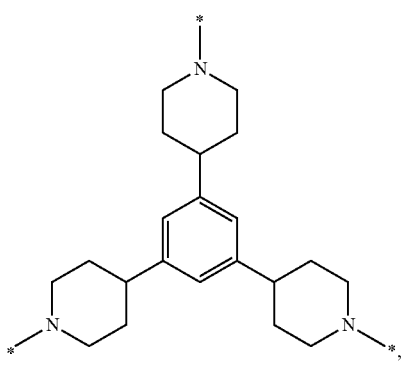
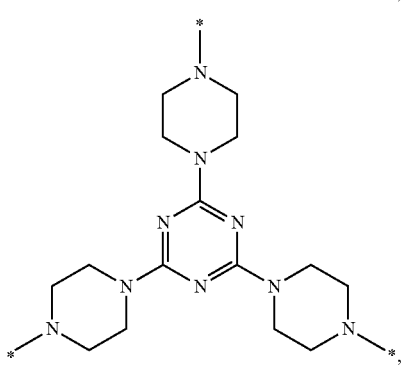
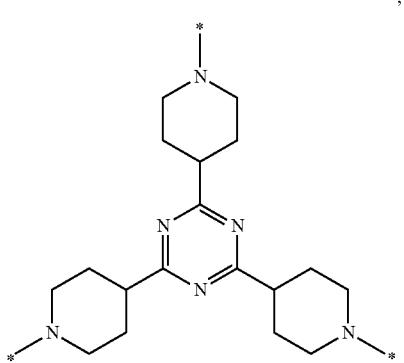
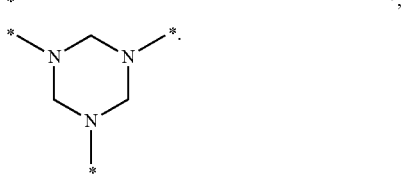
According to yet a further aspect of the invention, there is provided a phosphorus containing cross-linked network polymer of general formula (J)
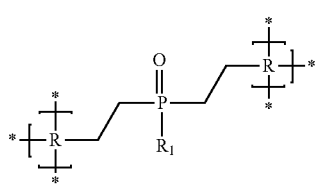
wherein R is selected from the group consisting of
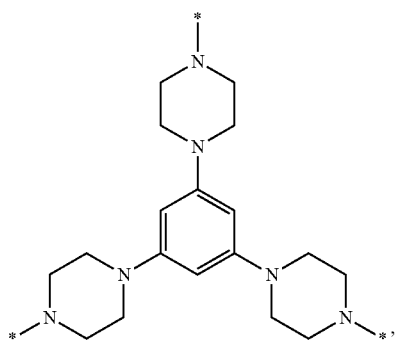
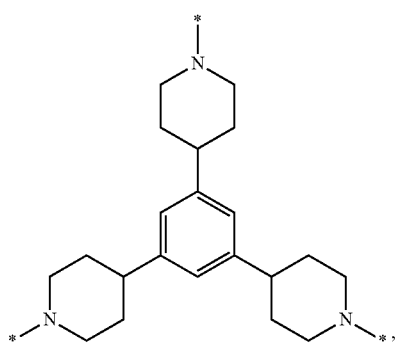
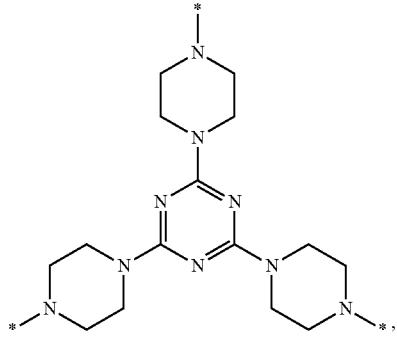
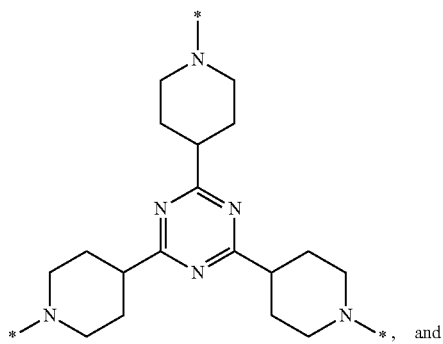
, and -continued

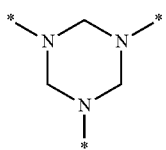

and wherein $R_1$ is selected from the group consisting of

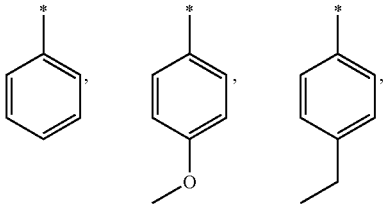

a linear or branched alkyl group with up to 5 carbon atoms, and a linear or branched alkoxy group with up to 5 carbon atoms.

According to another aspect of the invention, a method of preparing a cross-linked network polymer (J) as defined above comprises an addition reaction of a divinyl posphine oxide (K)

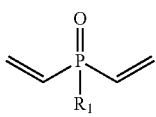

(K)

wherein $R_1$ is as defined above for (J), and an amine compound (H) containing three secondary amine groups according to

 (H)

wherein —N—R(N—)—N— is selected from the group consisting of

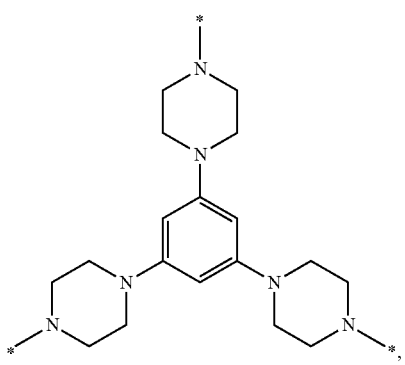

-continued

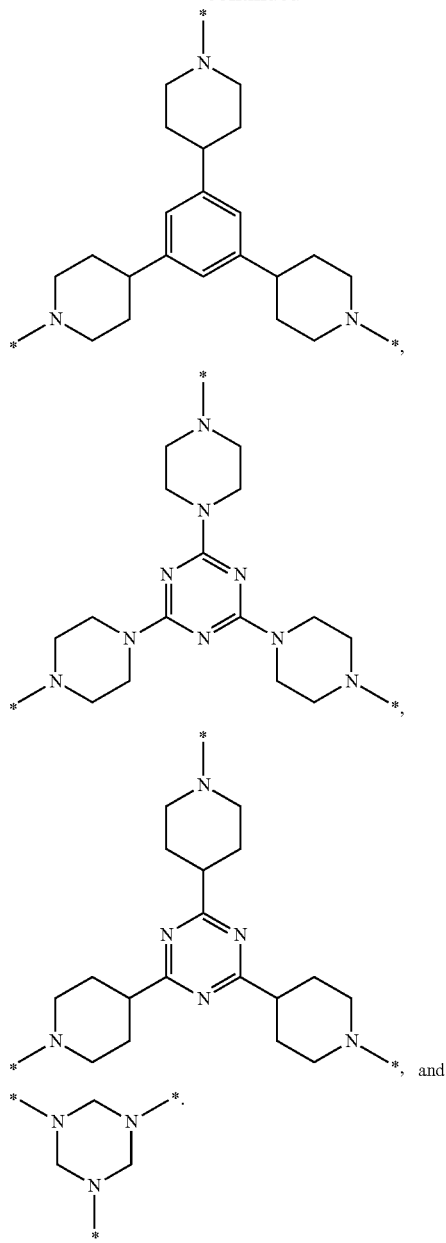

According to a further aspect of the invention, there is provided a phosphorus containing hydrogel or organogel comprising a cross-linked network polymer as defined above in water or in an organic solvent.

In advantageous embodiments, the above defined methods are carried out during thermal processing of a blend comprising a thermoplastic base polymer and an admixture of:

a posphine oxide (B), (E) or (K) containing at least two vinyl groups as defined above; and an amine compound (C), (F) or (H) containing at least two secondary amine groups as defined above.

Advantageously, the thermoplastic base polymer is a polyamide, polyolefin, polyester or polycarbonate.

According to another aspect of the invention, there is provided a method of forming a phosphorous containing polymer, the method comprising the following steps:

a) providing a mixture of a base polymer and a phosphine oxide (L) containing at least one vinyl group

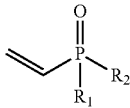 (L)

wherein,
$R_1$ is selected from the group consisting of a linear or branched alkyl group with up to 5 carbon atoms, a phenyl group and a vinyl group, and
$R_2$ is independently selected from the group consisting of a linear or branched alkyl group with up to 5 carbon atoms, a phenyl group, a vinyl group, a linear or branched alkoxy group with up to 5 carbon atoms and a phenoxy group;
said mixture optionally containing a free radical initiator;
and
b) subjecting said mixture to a radical initiation, thereby effecting an addition reaction wherein a phosphine oxide is grafted to the base polymer.

According to an advantageous embodiment, the base polymer is a polyamide or a polyester.

As known in principle, there are different ways to achieve radical initiation. According to one embodiment, the radical formation is effected by thermal activation, i.e. heating. The process can be self-catalyzing or it can be promoted by addition of a free radical initiator. According to another embodiment, the radical formation is effected by ultraviolet irradiation or by electron beam irradiation, which generally requires providing the reaction mixture in the form of a thin layer or fiber.

According to a further aspect, a phosphorus containing oligomer or polymer as defined above is used as flame retardant composition.

According to yet another aspect, there is provided a polymeric material with improved flame resistance, comprising a phosphorus containing oligomer or polymer as defined above admixed in a melt processable polymer,

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein are shown.

DETAILED DESCRIPTION OF THE INVENTION

An overview of functional additives playing an important role in the present work is given in the following Table 1:

TABLE 1

Chemical structures of functional phosphorus compounds and piperazine derivatives used in this work.

| No. | Chemical structure | Chemical name |
|---|---|---|
| DPVPO | | diphenyl(vinyl)phosphine oxide |
| DVPPO | | divinylphenylphosphine oxide |
| TVPO | | trivinylphosphine oxide |
| Neucleophiles | | Piperazine/Piperidine derivatives |

Y = C/N

Production of Flame-Retardant Polymer Systems

Figure 1:
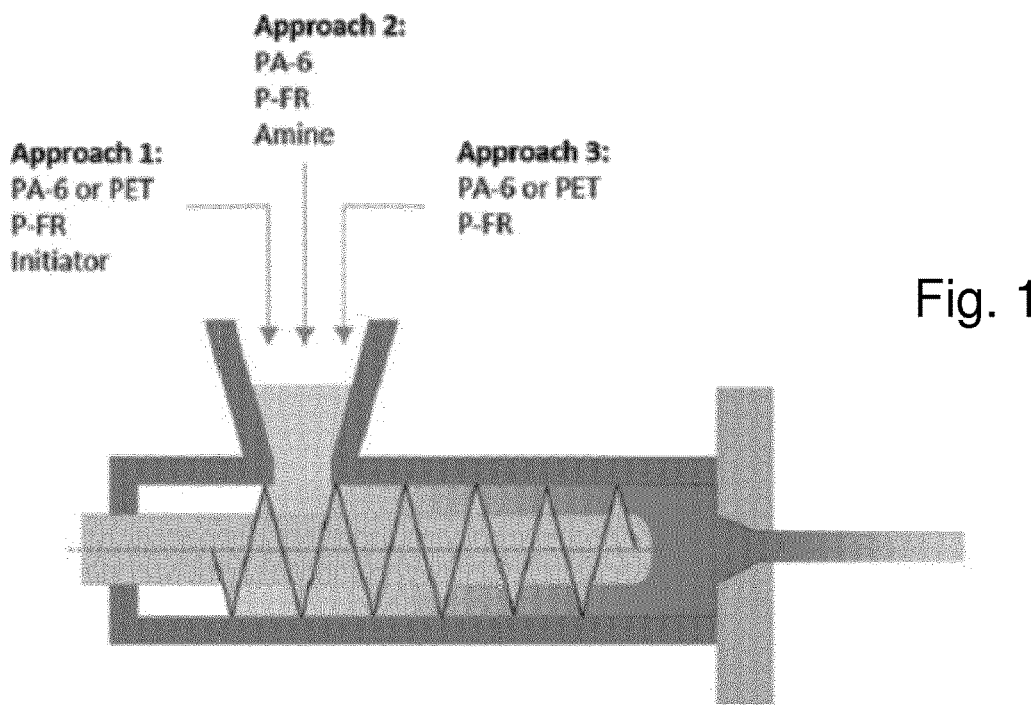
FIG. 1 an overview of approaches used to make flame retardant polymers.

As shown schematically in FIG. 1, non-leaching flame retardant polymer systems can be obtained by permanently immobilizing phosphorus additives with flame retardant moieties via three different approaches:

1) The first approach consists of grafting the vinyl containing phosphorus additives (DPVPO, DVPPO and TVPO) to the backbone of a base polymer by radical reaction in an extruder or kneader (reactive extrusion). The radical reaction can be self-catalyzing or can be promoted by addition of a free radical initiator:

Approach 1

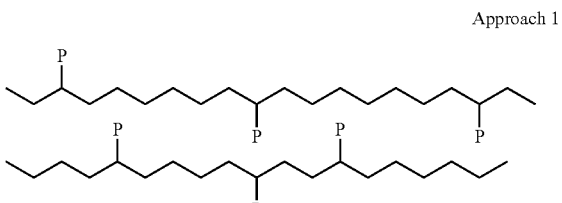

Grafting to the polymer backbone

In this manner the flame-retardant phosphorus containing moiety symbolized as "P" is directly attached to the backbone of the base polymer.

2) The second approach consists of in situ polymerization (reactive extrusion) of DVPPO or TVPO with nucleophiles (Michael Addition) during the thermal processing of a base polymer.

Approach 2

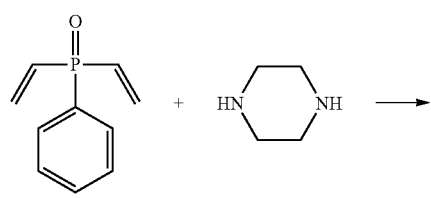

Michael addition reaction

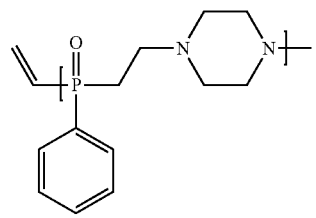

This leads to formation of long chained phosphorus containing macromolecules entangled within a network of polymer chains forming the base polymer. Although the species with flame retardant effect is not attached to the backbone of the base polymer, it will be prevented from leaching out due to the entanglement.

3) The third approach consists of physical mixing of the vinyl containing phosphorus additives (DPVPO, DVPPO and TVPO) and a suitable base polymer in an extruder or kneader. The extruded polymer is then converted into thin walled materials like fibers and films and subsequently subjected to UV or e-beam irradiation leading to radical formation and thereby cross-link the additive to the backbone of the base polymer.

Approach 3

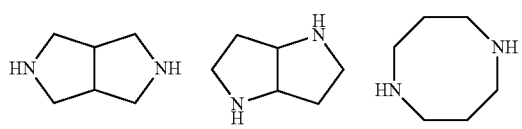

followed by UV or e-beam irradiation

The third approach potentially leads to similar structures as the first approach, although via a different route.

Preparation of Gels

The gels can be prepared by reacting either divinyl or trivinyl phosphorus compounds with appropriate nucleophiles (see Scheme 1) via a Michael addition reaction in water suitable organic solvents.

Scheme 1 General structure of amine containing nucleophiles for synthesis of Gels

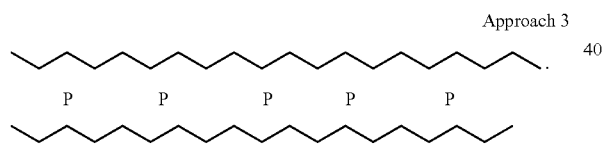

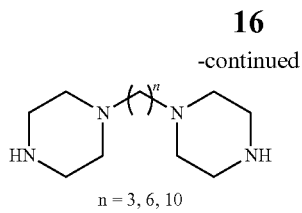

n = 3, 6, 10

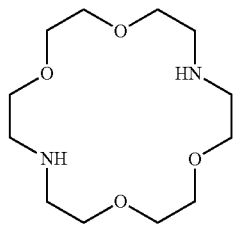

The general structures of gels made from trivinyl phosphorus derivatives (TVPO) are shown in Scheme 2:

Scheme 2 General chemical structure of Gels (TVPPO derivatives)

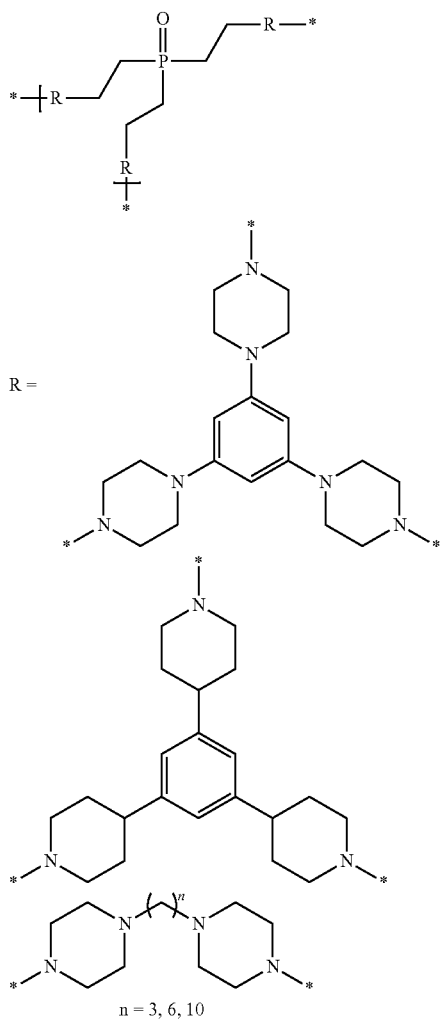

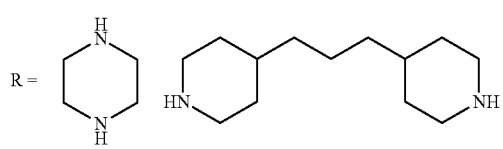

n = 3, 6, 10

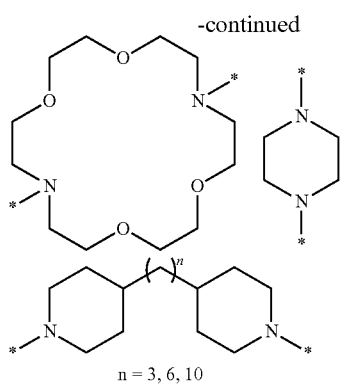

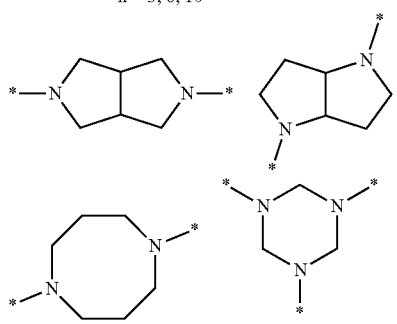

The general structure of gels made from divinyl phosphorus derivatives are shown in Scheme 3:

Scheme 3 General chemical structure of Gels (divinyl phosphorus derivatives)

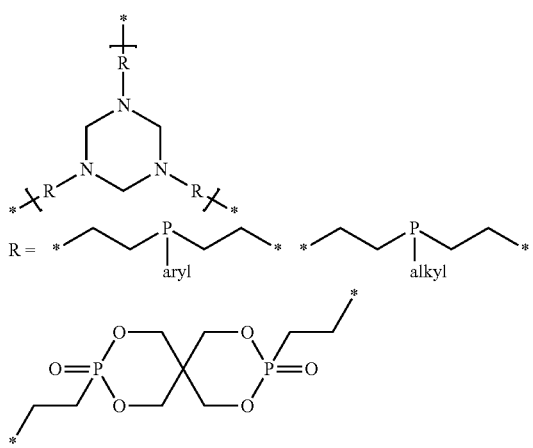

Examples

1. Flame Retardant Polymers

Processing (Approach 1)

All phosphorus-based additives used in this work contain one or more vinyl groups that can react with the methylene groups (—CH2-) of PA6 and PET by radical reaction. Table 2 summarizes the list of processing trials performed on the reactive phosphorus additives. In order to promote the radical reaction, a radical initiator was added in some experiments.

The kneading trials were performed at 240° C. for PA-6 and 260° C. for PET and 30 rpm using a Brabender-mixer. The polymer was fed first and the additives were fed after two minutes, the total mixing time was 10 minutes.

TABLE 2

Details of formulations of kneading trials (Approach 1)

| Sample name | Base polymer | Additive 1 content [wt %] | Additive 2 content [wt %] | Reaction |
|---|---|---|---|---|
| PA6 | PA-6 | — | — | |
| PA6/DP | PA-6 | 5.0% DPVPO | — | Radical |
| PA6/DP/DCP | PA-6 | 5.0% DPVPO | 0.1% DCP | Radical |
| PA6/TVPO | PA-6 | 5.0% TVPO | — | Radical |
| PA6/TVPO/DCP | PA-6 | 5.0% TVPO | 0.1% DCP | Radical |
| PA6/DVPPO | PA-6 | 5.0% DVPPO | — | Radical |
| PA6/DVPPO/DCP | PA-6 | 5.0% DVPPO | 0.1% DCP | Radical |
| PET | PET | — | — | |
| PET/DPVPO | PA-6 | 5.0% DPVPO | — | Radical |
| PET/DPVPO/DCP | PA-6 | 5.0% DPVPO | 0.1% DCP | Radical |
| PET/TVPO | PA-6 | 5.0% TVPO | — | Radical |
| PET/TVPO/DCP | PA-6 | 5.0% TVPO | 0.1% DCP | Radical |
| PET/DVPO | PA-6 | 5.0% DVPPO | — | Radical |
| PET/DVPPO/DCP | PA-6 | 5.0% DVPPO | 0.1% DCP | Radical |

% wt = weight percent

Processing (Approach 2)

The vinyl groups of the phosphorus additives used in this work can react with the amino groups (—NH—) of PA-6 and/or Piperazine by Michael addition reaction. Table 3 explicates the trial performed on the reactive phosphorus additives. The trial was performed at 240° C. and 30 rpm using a Brabender-mixer.

TABLE 3

Details of formulation of extrusion trials (Approach 2)

| Sample name | Base polymer | Additive 1 content [wt %] | Additive 2 content [wt %] | Reaction |
|---|---|---|---|---|
| PA6/DVPPO/PIP | PA-6 | 5.0% DVPPO | 2.5% PIPERAZINE (1:1 mol) | Michael addition |

% wt = weight percent
PIP = Piperazine

Processing (Approach 3)

The third approach consists of physical mixing of the flame-retardant additive and the polymer by kneading and subsequently e-beam treatment to crosslink the additive to the polymer backbone. This physical mixing is not considered reactive extrusion; however, we cannot avoid reaction of some vinyl groups of the phosphorus additives with the polymer, even in absence of any radical initiator. Some of the materials obtained via approach 1 and 2 were used in the post crosslinking experiments; the list is shown in Table 4.

Plates (150*50*0.5 mm) of the above materials have been made by compression molding at 260° C. for PA6 and 290° C. for PET. The plates were subsequently exposed to electron irradiation. The energy supplied through the electron beams allows the reaction between the vinyl groups present in the additives and the polymer chains.

The plates were treated on both sides (the penetration of the electron beam is 200-250 μm) in N2-atmosphere at 200 kV with a speed of 6 m/min. In order to evaluate the amount of reacted additive as a function of the energy supplied doses of 50, 100 and 200 kGy were used.

TABLE 4

Details of formulation of kneading trials (Approach 3)

| Sample name | Base polymer | Additive 1 content [wt %] | Additive 2 content [wt %] |
|---|---|---|---|
| PA6/DP | PA-6 | 5.0% DPVPO | — |
| PA6/DV | PA-6 | 5.0% DVPPO | — |
| PA6/DV/PIP | PA-6 | 5.0% DVPPO | 2.5% PIPERAZINE (1:1 mol) |
| PET/DP | PET | 5.0% DPVPO | — |

Thermal Data

Table 5 summarizes the thermal data of all polymer formulations obtained by Approach 1 and Approach 2. From the thermal gravimetric analysis (TGA) performed, it is clear that additives lower the decomposition temperature of the PA in air and nitrogen and this effect is more evident in the materials processed with DCP. No significant differences in melting and crystallization temperature were detected from differential scanning calorimetry analysis (DSC).

TABLE 5

Thermal data of all formulations

| Sample name | TD5%/ Air [° C.] | TD-main/ Air [° C.] | TD5%/ $N_2$ [° C.] | TD-main/ $N_2$ [° C.] | Melting Point [° C.] | Crystallization Point [° C.] |
|---|---|---|---|---|---|---|
| PA6 | 354 | 428 | 388 | 453 | 222 | 195 |
| PA6/DPVPO | 325 | 417 | 365 | 426 | 223 | 189 |
| PA6/DPVPO/DCP | 361 | 409 | 370 | 405 | 224 | 188 |
| PA6/TVPO | 325 | 406 | 359 | 413 | 220 | 184 |
| PA6/TVPO/DCP | 337 | 409 | 358 | 417 | 221 | 191 |
| PA6/DVPO | 343 | 409 | 352 | 420 | 220 | 189 |
| PA6/DVPO/DCP | 362 | 422 | 381 | 423 | 217 | 191 |
| *PA6/DVPO/PIP | 326 | 424 | 347 | 426 | 220 | 180 |
| PET | 386 | 395 | 400 | 430 | 250 | 190 |
| PET/DPVPO | 374 | 390 | 379 | 399 | 254 | 205 |
| PET/DPVPO/DCP | 368 | 384 | 378 | 397 | 253 | 201 |
| PET/TVPO | 375 | 391 | 381 | 392 | 245 | 195 |
| PET/TVPO/DCP | 369 | 388 | 378 | 389 | 244 | 194 |
| PET/DVPO | 376 | 392 | 381 | 391 | 250 | 198 |
| PET/DVPO/DCP | 373 | 387 | 379 | 385 | 248 | 196 |

*Material obtained via approach 2

Evaluation of Phosphorus Content and Retention of Various Polymer Formulations (Approach 1 and 2)

The extruded polymers were then grinded and extracted with chloroform. The P-analysis using ICP instrument was done for each sample before and after extraction to calculate the flame retardant retained. The various formulations were evaluated for % P content using ICP-OES method. To estimate the % P retention the polymer formulations were extracted with chloroform at 100° C. for 1 hour and then estimated for % P retention. Table 6 presents the phosphorus content and its retention after solvent extraction.

TABLE 6

Phosphorus content and retention of all formulations

| Sample name | Phosphorus content Theoretical [wt %] | Phosphorus content Actual [wt %] | Phosphorus content After Extraction** [wt %] | Phosphorus Retention [%] |
|---|---|---|---|---|
| PA6 | — | — | — | — |
| PA6/DPVPO | 0.68 | 0.51 | 0.13 | 25.5 |
| PA6/DPVPO/DCP | 0.68 | 0.62 | 0.48 | 77.4 |
| PA6/TVPO | 1.20 | 1.14 | 0.90 | 78.9 |
| PA6/TVPO/DCP | 1.20 | 0.87 | 0.55 | 57.5 |
| PA6/DVPPO | 0.87 | 0.77 | 0.33 | 42.9 |
| PA6/DVPPO/DCP | 0.87 | 0.71 | 0.51 | 71.8 |
| *PA6/DVPPO/PIP | 0.87 | 0.74 | 0.43 | 58.1 |
| PET | | | | |
| PET/DPVPO | 0.68 | 0.60 | 0.01 | 1.3 |
| PET/DPVPO/DCP | 0.68 | 0.61 | 0.09 | 15.3 |
| PET/TVPO | 1.20 | 0.86 | 0.43 | 49.5 |
| PET/TVPO/DCP | 1.20 | 0.86 | 0.59 | 68.6 |
| PET/DVPPO | 0.87 | 0.76 | 0.34 | 44.7 |
| PET/DVPO/DCP | 0.87 | 0.74 | 0.30 | 40.5 |

*Material obtained via approach 2
**The extraction was performed in Chloroform (1 ml solvent /100 mg material) at 100° C., 30 bars for 1 hour. The solution was stirred.
% wt = weight percent The trial PA6/DV/PIP has showed promising processability characteristics as well as higher phosphorus retention, which led to the production of compound (PA6/DV/PIP-Comp) in kilogram quantity and subsequent fibers (PA6/DV/PIP-FB) with the same concentration of additives. The virgin PA-6 was previously dried in a vacuum oven at 100° C. for 12 hrs and then physically premixed with the additives for 30 mins. This compound was obtained using a corotating twin screws (16 mm) compounder; the processing temperature and the temperature of the die were respectively 265° C. and 251° C. at 110 rpm. The output rate of the compounder was 500 g/hr. The same compound was used to produce fibers; the processing temperature and the temperature of the spin pack were 275° C. and 245° C. respectively and the output rate was 360 cm$^3$/hr. The resulting filament was drawn up to a draw ratio of 4 which led to final fiber diameter of 70 μm.

TABLE 7

Phosphorus content and retention of compound and fibers

| Sample name | Phosphorus content Theoretical [wt %] | Phosphorus content Actual [wt %] | Phosphorus content After Extraction [wt %] | Phosphorus Retention [%] |
|---|---|---|---|---|
| PA6-Virg | — | — | — | — |
| PA6/DV/PIP | 0.87 | 0.74 | 0.43 | 58.1 |

TABLE 7-continued

Phosphorus content and retention of compound and fibers

| Sample name | Phosphorus content Theoretical [wt %] | Phosphorus content Actual [wt %] | Phosphorus content After Extraction [wt %] | Phosphorus Retention [%] |
|---|---|---|---|---|
| PA6/DVPPO/PIP-Comp | 0.87 | 0.73 | 0.43 | 58.9 |
| PA6/DVPPO/PIP-FB | 0.87 | 0.73 | 0.54 | 74.0 |

% wt = weight percent

Virg = virgin,

Comp = Compound,

FB = Fiber

As shown in Table 7, compounding and kneading (PA6/DV/PIP-Comp and PA6/DV/PIP) gave similar results in terms of phosphorus retention. Instead, the % P retention significantly increased for the fibers, it is probably due to the longer processing of the material, which leads to a higher reaction yields (Michael Addition).

Mechanical Property of Fibers

The mechanical properties of the fibers were investigated; they are summarized in Table 8 and data presented are the average over 20 measurements.

TABLE 8

Mechanical properties of the obtained fibers

| Sample name | Force at break [cN/dtex] | Elongation at break [%] | Young's Modulus [cN/dtex] |
|---|---|---|---|
| PA6-FB | 6.0 | 52.3 | 23.0 |
| (Stdev %) | (2.4) | (5.5) | (3.8) |
| PA6/DVPPO/PIP-FB | 4.1 | 40.1 | 34.2 |
| (Stdev %) | (4.8) | (11.7) | (6.4) |

Evaluation of Phosphorus Content and Retention of Various Polymer Formulations (Approach 3)

The e-beam treated plates were then grinded and extracted with chloroform. The P-analysis using ICP instrument was done for each sample before and after extraction to calculate the flame retardant retained. The various formulations were evaluated for % P content using ICP-OES method. To estimate the % P retention the polymer formulations were extracted with chloroform at 100° C. for 1 hour and then estimated for % P retention. Table 9 summarizes the various polymer formulations, e-beam treatments intensity and their % P content and retention.

TABLE 9

Phosphorus content and retention of the ebeam-treated materials (Approach 3)

| Sample name | Radiation energy absorbed [kGy#] | Phosphorus content Actual [wt %] | Phosphorus content After Extraction [wt %] | Phosphorus Retention [%] |
|---|---|---|---|---|
| PA6/DPVPO | — | 0.51 | 0.13 | 25.5 |
|  | 50 | 0.51 | 0.46 | 90.2 |
|  | 100 | 0.48 | 0.46 | 95.8 |
|  | 200 | 0.51 | 0.47 | 92.2 |
| PA6/DVPPO | — | 0.77 | 0.33 | 42.9 |
|  | 50 | 0.76 | 0.70 | 92.1 |
|  | 100 | 0.77 | 0.70 | 90.9 |
|  | 200 | 0.78 | 0.72 | 92.3 |
| *PA6/DVPPO/PIP | — | 0.74 | 0.43 | 58.1 |
|  | 50 | 0.69 | 0.70 | 100 |
|  | 100 | 0.70 | 0.69 | 98.6 |
|  | 200 | 0.67 | 0.68 | 100 |
| PET/DPVPO | — | 0.60 | 0.01 | 1.3 |
|  | 50 | 0.61 | 0.07 | 12.2 |
|  | 100 | 0.59 | 0.07 | 11.7 |
|  | 200 | 0.60 | 0.09 | 15.7 |

The "gray" (Gy) is defined as the absorption of one joule of radiation energy per kilogram of matter.

As shown in Table 9, even with low e-beam irradiation, phosphorus retention higher than 90% was achieved for all the PA6-based materials. Thus, this procedures offer a novel way of permanently immobilizing FR additives in the polymer. For PET-based material, after the e-beam irradiation, the phosphorus retention increased significantly but the values are still low.

Fire Tests Materials Obtained Via Approach 2

Small-scale fire tests were performed on various formulations to evaluate their fire behavior. Limiting oxygen index (LOI) test and vertical burning test (BKZ— Swiss standard) were performed on plates of PA6-MB and PA6/DV/PIP-Comp. For both tests, plates (150*50*0.5 mm) of the above materials have been made by compression molding at 260° C.

The LOI is the minimum concentration of oxygen, expressed as a percentage, which will support combustion of a polymer; it is measured by flowing a mixture of oxygen and nitrogen over a burning specimen, the test is repeated reducing the oxygen concentration until the flame does not propagate.

The test consists in putting in contact the lower edge of the samples with a propane gas flame (40±2 mm in length) for 15 s. The burner is inclined by 45° relative to the vertical line. The damaged length and the afterglow time are measured.

TABLE 10

Fire test results

| Sample name | Limiting Oxygen Index □ [%] | Damaged length □ [cm] | Afterglow time □ [s] |
|---|---|---|---|
| PA6-MB | 25.6 | 4.80 | 18 |
| PA6/DVPPO/PIP-MB | 30.2 | 2.27 | 1 |

□ The values are the average of 3 tests.

Thus, it is clear such flame-retardant modifications improve the fire protections of polyamide 6 remarkably.

2. Gels

Synthesis of Gel-A

TVPO (64.02 mg, 0.50 mmol) and piperazine (64.60 mg, 0.75 mmol) were added to water (2.5 ml). The resulting mixture was stirred at 90° C. for 0.5 h and a colorless transparent gel was obtained. The solvents were evaporated by freeze-drying.

Scheme 4. Synthesis of Gel-A

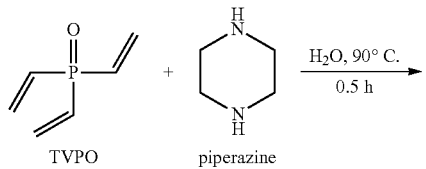

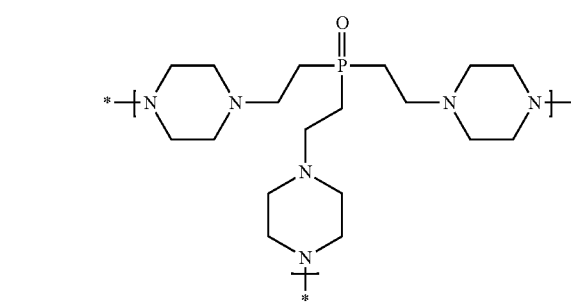

Synthesis of Gel-A1

TVPO (64.02 mg, 0.50 mmol), piperazine (64.60 mg, 0.75 mmol) Polyethylene glycol (20K) (12.80 mg, 10%) were added to water (2.5 ml). The resulting mixture was stirred at 90° C. for 0.5 h. The solvents were evaporated by freeze-drying.

Scheme 5. Synthesis of Gel-A1

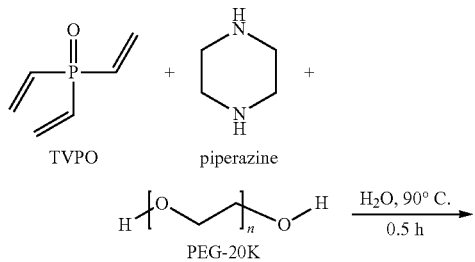

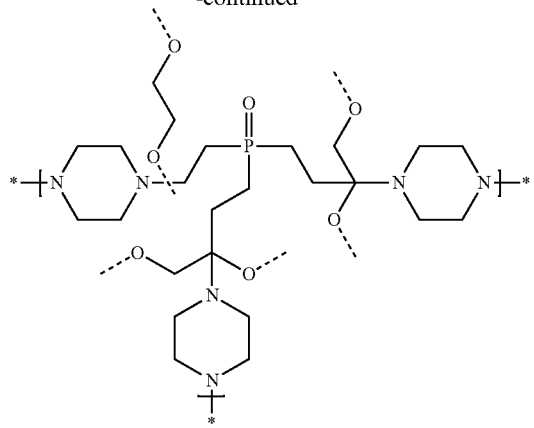

Synthesis of Gel-A2

TVPO (64.02 mg, 0.50 mmol), piperazine (64.60 mg, 0.75 mmol) Polyethylene glycol (200K) (6.40 mg, 5%) were added to water (2.5 ml). The resulting mixture was stirred at 90° C. for 0.5 h. The solvents were evaporated by freeze-drying.

Scheme 6. Synthesis of Gel-A2

Synthesis of Gel-A3

TVPO (64.02 mg, 0.50 mmol), piperazine (64.60 mg, 0.75 mmol) Polyethylene glycol (300 K) (6.90 mg, 5%) were added to water (2.5 ml). The resulting mixture was stirred at 90° C. for 0.5 h. The solvents were evaporated by freeze-drying.

Scheme 7. Synthesis of Gel-A3

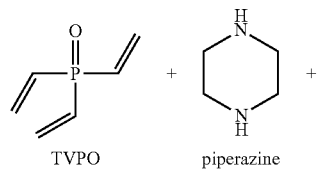

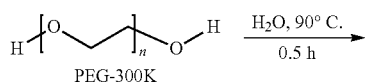

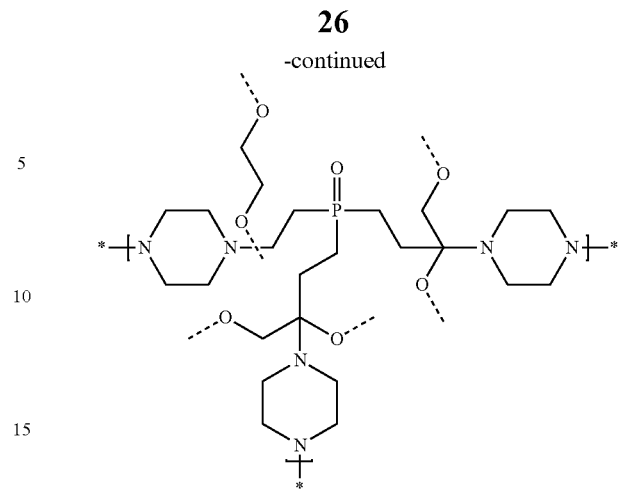

Synthesis of Gel-B

TVPO (128 mg, 1 mmol) and DPP (157.7 mg, 0.75 mmol) were added to Ethanol (2.5 ml). The resulting mixture was stirred at 80° C. for 1.5 h. The solvents were evaporated by freeze-drying.

Scheme 8. Synthesis of Gel-B

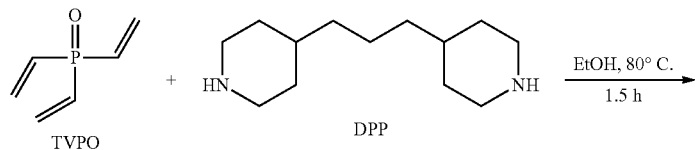

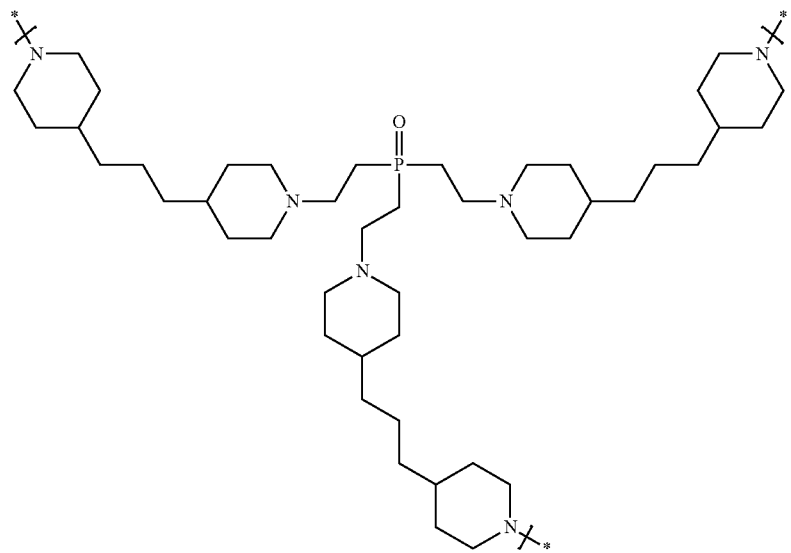

Synthesis of Gel-C

TVPO (64.02 mg, 0.50 mmol) and 1,10-di(piperazin-1-yl)decane (232.89 mg, 0.75 mmol) were added to ethanol (5 ml). The resulting mixture was stirred at 85° C. for 8 h and a colorless transparent gel was obtained. The solvents were evaporated by freeze-drying.

Scheme 9. Synthesis of Gel-C
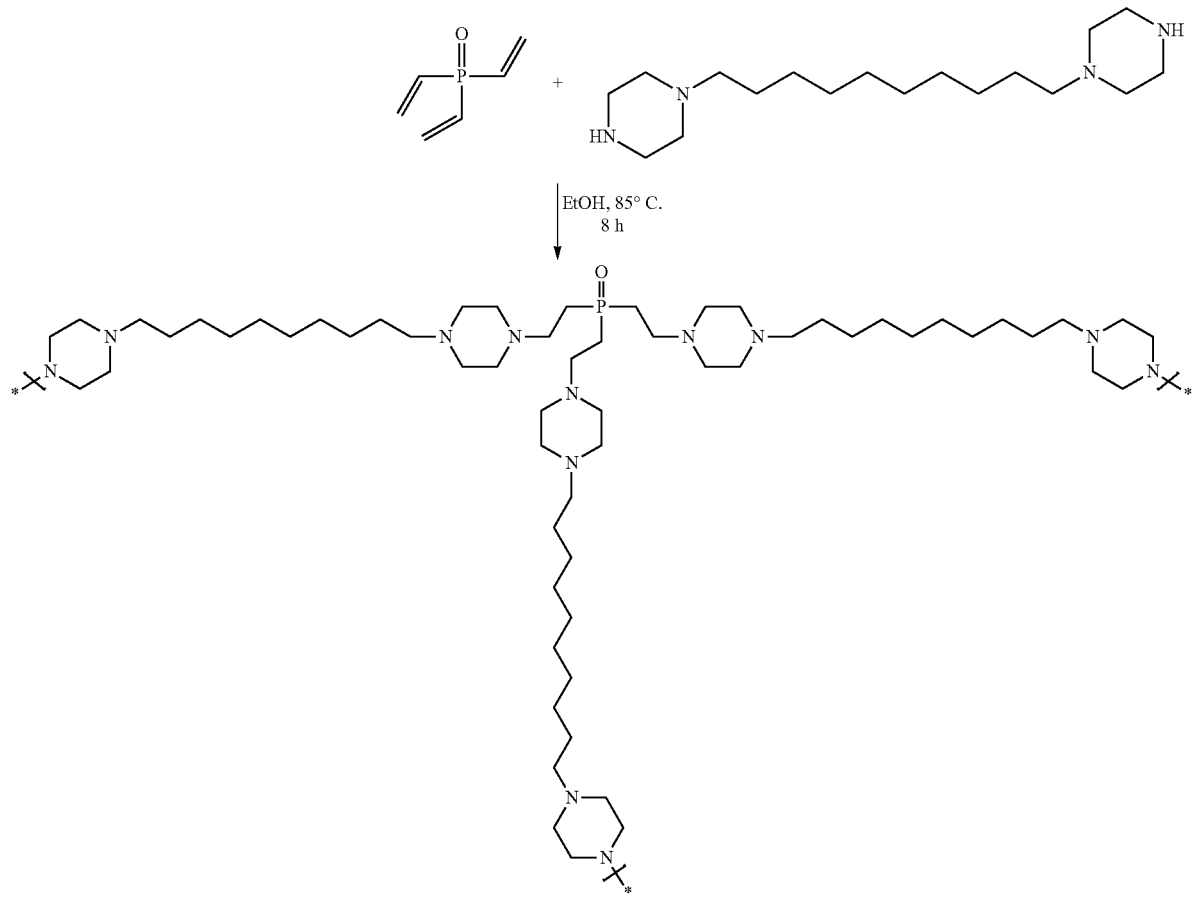
Synthesis of Gel-D
TVPO (64.02 mg, 0.50 mmol) and 2,4,6-tri(piperazin-1-yl)-1,3,5-triazine (166.72 mg, 0.50 mmol) were added to ethanol (5 ml). The resulting mixture was stirred at 85° C. for 1 h and a colorless transparent gel was obtained. The solvents were evaporated by freeze-drying.
Scheme 10. Synthesis of Gel-D
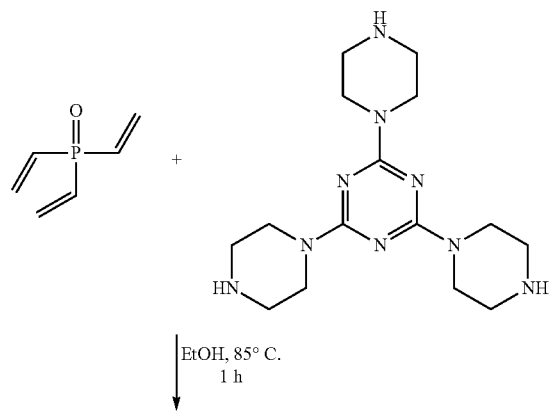

-continued
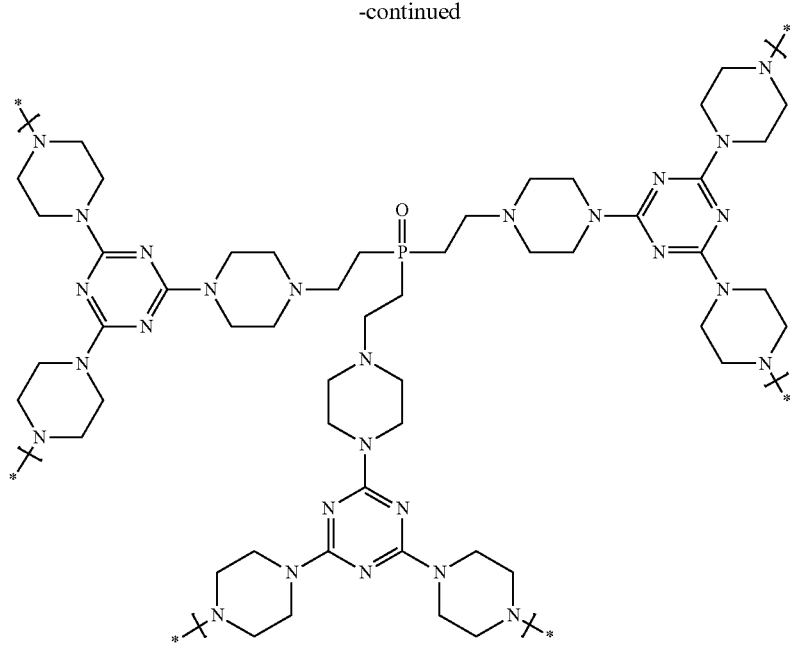
Synthesis of Gel-E
DVPO (133.54 mg, 0.75 mmol) and 2,4,6-tri(piperazin-1-yl)-1,3,5-triazine (166.72 mg, 0.50 mmol) were added to ethanol (5 ml). The resulting mixture was stirred at 85° C. for 8 h and a colorless transparent gel was obtained. The solvents were evaporated by freeze-drying.
Scheme 11. Synthesis of Gel-E
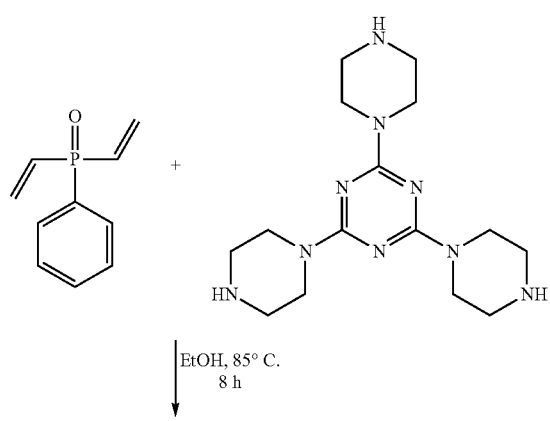
EtOH, 85° C.
8 h -continued

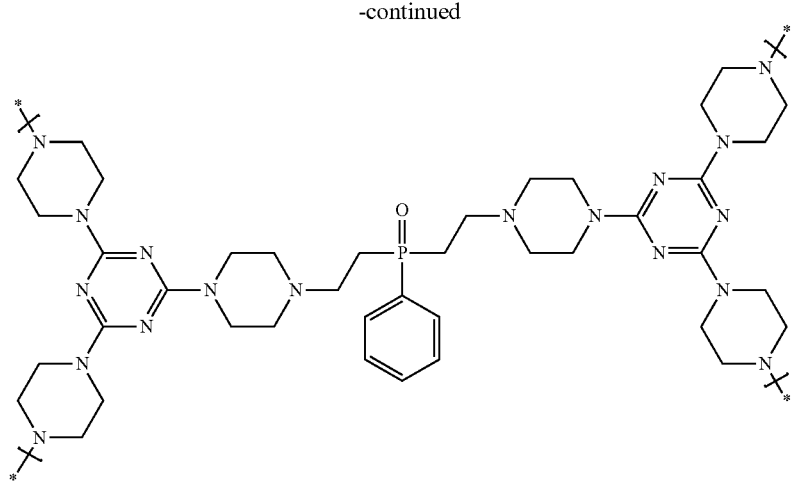

Properties of Gels

1. Swelling Behavior

Swelling ratio of cross-linked gels was measured by soaking the gel in a particular solvent till to reach equilibrium swelling. Then, the swelled gel was taken out by spatula on a butter paper carefully, blotted quickly with a moist tissue paper (in respective solvent) and weighed. The solvent uptake ratio (swelling ratio, SR) of swelled gel was determined following the formula:

$$\text{Swelling Ratio } (SR) = \frac{Ws - Wd}{Wd}$$

Where, Ws and Wd represent the weight of swelled and dry crosslinked gels respectively. The swelling behavior of synthesized gels have been investigated in solvents having different polarities and results are summarized in Table 11.

TABLE 11

| Swelling ratios of gels in different solvents | | | | |
|---|---|---|---|---|
| Gels | Toluene | DCM | EtOH | Water |
| Gel-A | 1.91 | 16.56 | 11.2 | 20.91 |
| Gel-A1 | — | — | — | 9.7 |
| Gel-A2 | — | — | — | 10.19 |
| Gel-A3 | — | — | — | 9.2 |
| Gel-B | 1.9 | 16.5 | 11.6 | 0.5 |

2. pH-Responsiveness of Hydrogels pH responsive properties of hydrogels were performed at room temperature in the range of pH 2 to 7.4. pH of the aqueous media was adjusted by 0.1 N NaOH or 0.1 N HCl solution. A measured amount of gel was soaked at a particular pH till equilibrium swelling was achieved, then, taken out, blotted quickly with a moist tissue paper and weighted. Swelling ratio was calculated as mentioned earlier.

TABLE 12

| Effect of pH on swelling ratio of Gel A | | | | | | |
|---|---|---|---|---|---|---|
| pH 2 | pH 3 | pH 4 | pH 5 | pH 6 | pH 7 | pH 7.4 |
| 23.65 | 13.85 | 12.42 | 7.35 | 5.78 | 20.91 | 4.93 |

3. Drug Release Property of Gels

The release behavior of a gel describes the release of certain substances trapped in the gel matrix. This can be influenced by different factors such as pH, temperature, ionic strength, electric field or specific analyte concentration gradients. Depending on the factor, the gels are suitable for different application areas. Healthy human skin is slightly acidic due to secretion of lactic acid and sebum and has a pH of about 5. In certain injuries, the pH changes to neutral or basic 10 (blood pH=~7.4). Such stimuli can be utilized to trigger the release of active ingredients. Once the skin has regenerated, the pH drops and the release is inhibited or stopped altogether. Gels that are pH-sensitive can be applied to wounds.

Figure 2:
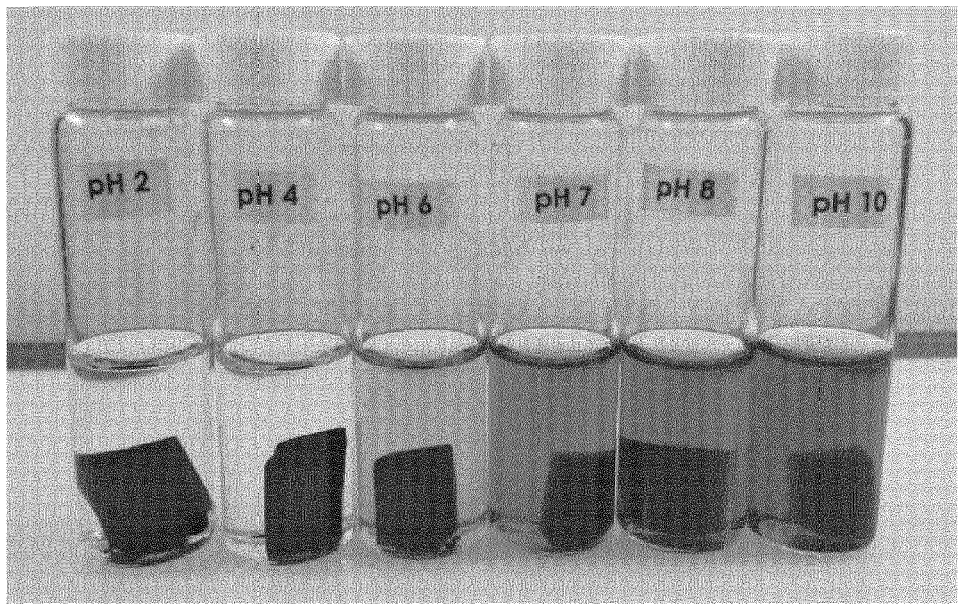
FIG. 2 the release behavior of Gel A for Acid Blue 80 at different pH-values, after 24 hours.

To study the drug release behavior, Methylene blue and Acid Blue 80 were chosen as the model molecules. The model molecule was initially dissolved in water (1 mg/1 ml) at room temperature and then gels were soaked in it. After 4 h the gels were removed from the solution and washed with water repeatedly till colorless water was obtained. As qualitative estimation for gel A as an example, the release of Acid Blue 80 was estimated visually. The figure (FIG. 2) clearly indicates release of Acid Blue 80 preferentially at pH higher than 7.

Figure 3:
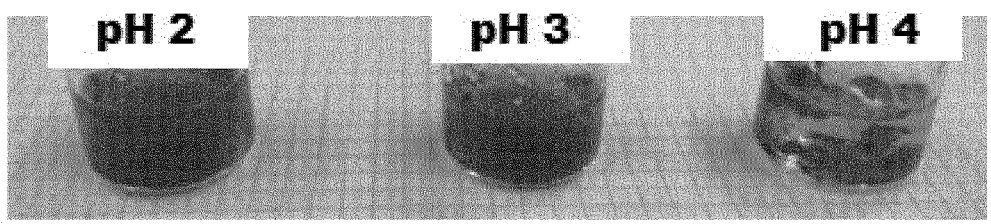
FIG. 3 the release behavior of Gel A for methylene blue at different pH-values, after 4 hours.

Similarly, the qualitative estimation of release behavior of gel A containing methylene blue (model basic drug) was also recorded. The figure (FIG. 3) clearly indicates higher release of Methylene blue preferentially at lower pH.

The invention claimed is:

1. A phosphorus containing linear oligomer or polymer comprising general formula (A)

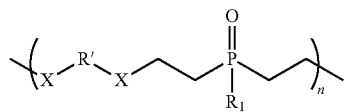
(A)

wherein n is at least 2;

R₁ is selected from the group consisting of phenyl, substituted phenyl, benzyl, substituted benzyl, a linear or branched alkyl group with up to 5 carbon atoms, and a linear or branched alkoxy group with up to 5 carbon atoms;

—X—R'—X— is selected from the group consisting of

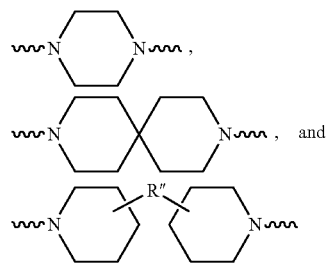

wherein R" is a linear or branched alkyl group with up to 5 carbon atoms in ortho, meta or para position, or —X—R'—X— is —NR₂—R'''—NR₂— wherein R₂ is a methyl or alkyl group and R''' is selected from the group consisting of:

a linear or branched alkyl group with up to 5 carbon atoms,

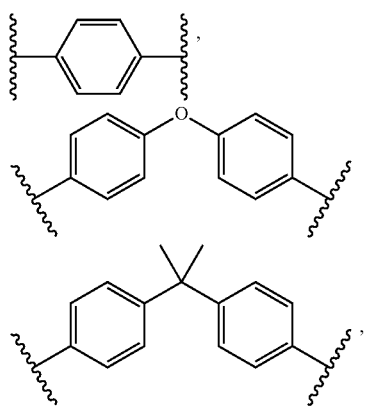

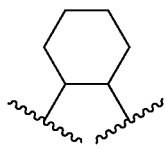

2. A method of preparing a phosphorus containing oligomer or polymer (A) according to claim 1, the method comprising an addition reaction of a divinyl posphine oxide (B)

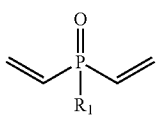
(B)

and an amine compound (C) containing two secondary amine groups according to

H—X—R'—X—H (C).

3. A phosphorus containing cross-linked network polymer comprising: (i) general formula (D)

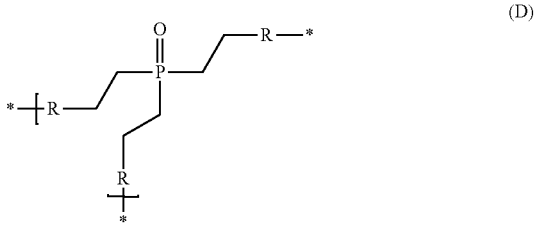
(D)

wherein R is selected from the group consisting of

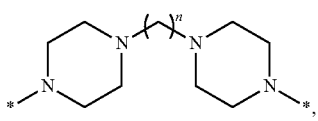

n = 3, 6, 10

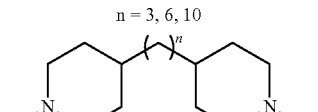

n = 3, 6, 10

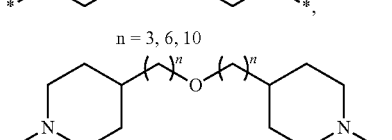

n = 0, 2, 4, 6

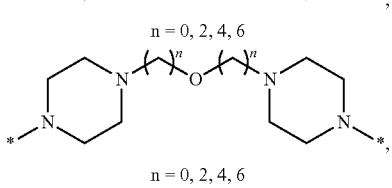

n = 0, 2, 4, 6

-continued
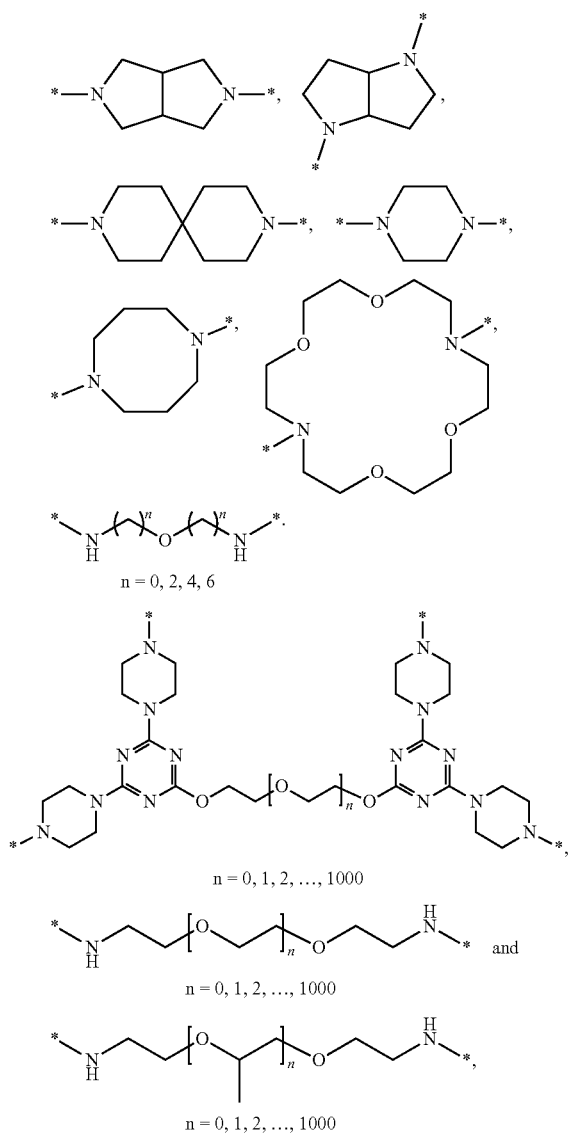
n = 0, 2, 4, 6
n = 0, 1, 2, ..., 1000
n = 0, 1, 2, ..., 1000
and
n = 0, 1, 2, ..., 1000
or
(ii) general formula (G)
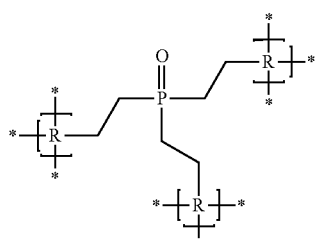
(G)
wherein R is selected from the group consisting of
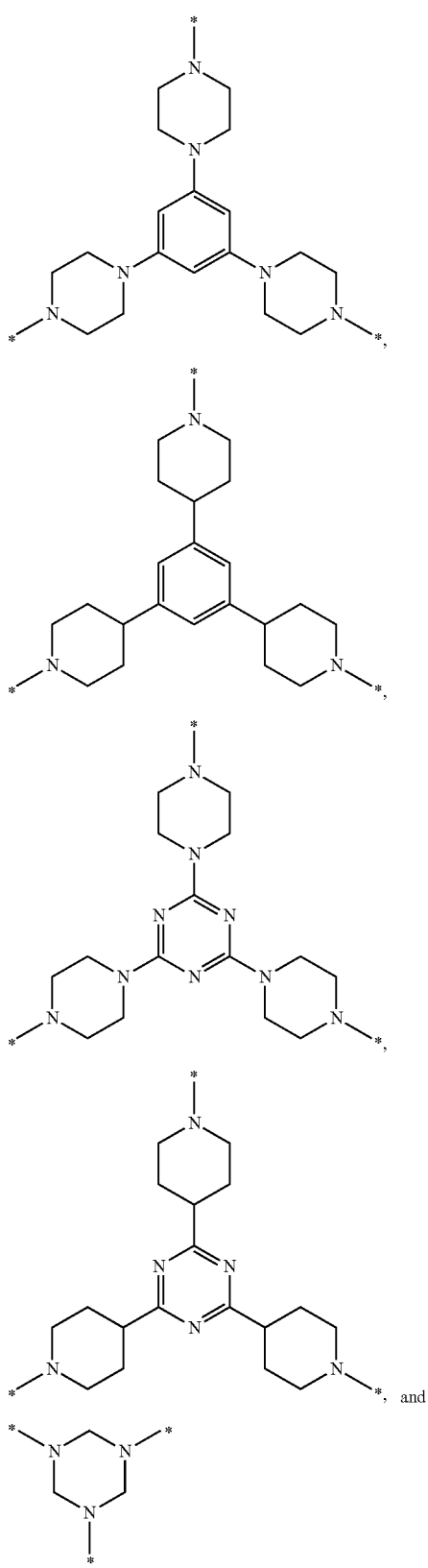

or (iii) general formula (J)

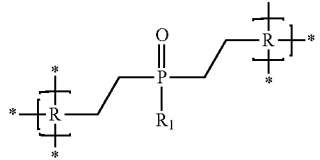
(J)

wherein R is selected from the group consisting of

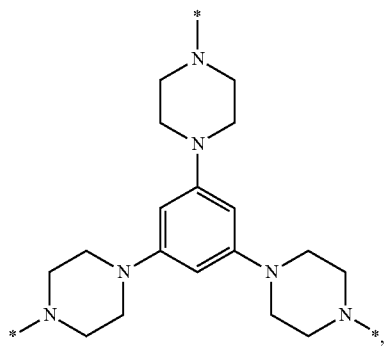

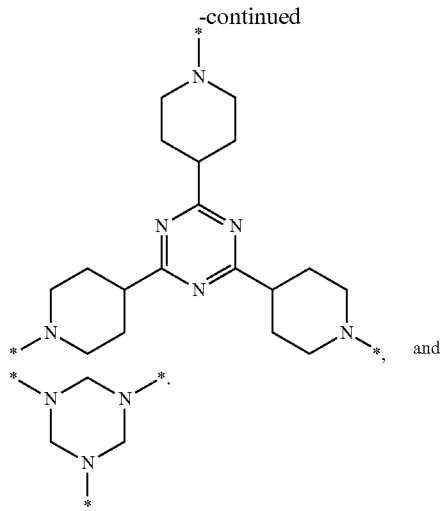
and and wherein $R_1$ is selected from the group consisting of

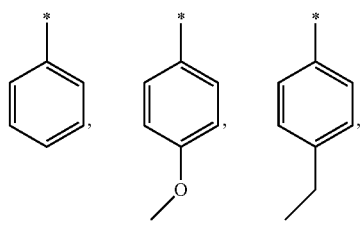

a linear or branched alkyl group with up to 5 carbon atoms, and a linear or branched alkoxy group with up to 5 carbon atoms.

4. A method of preparing a cross-linked network polymer (D) according to claim 3, the method comprising an addition reaction of trivinyl posphine oxide (E)

(E)

and an amine compound (F) containing two secondary amine groups according to

H—N—R—N—H (F)

wherein —N—R—N— is selected from the group consisting of

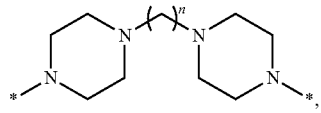

n = 3, 6, 10

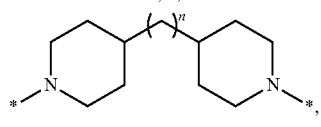

n = 3, 6, 10

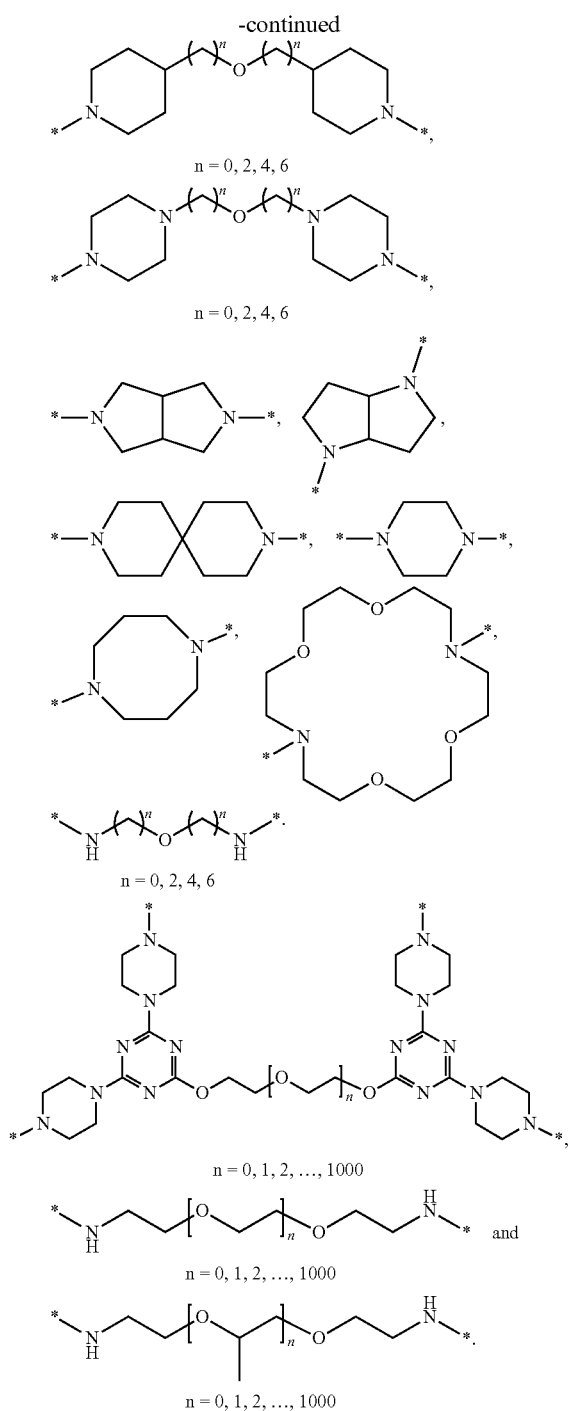
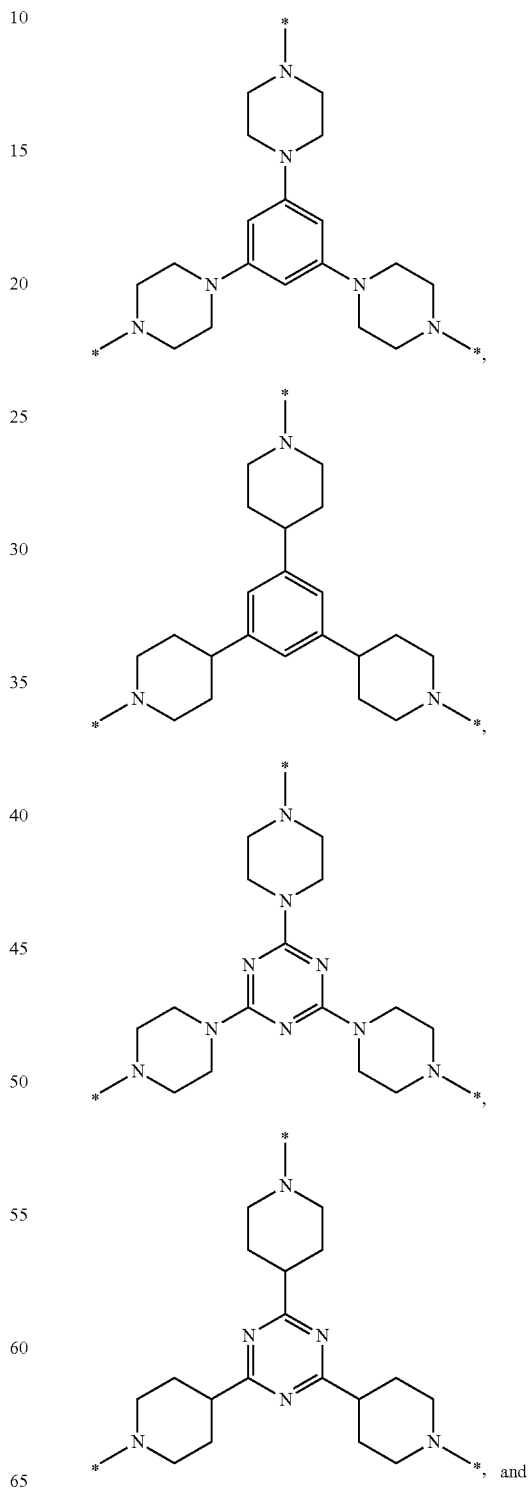
and an amine compound (H) containing three secondary amine groups according to
—HN—R(NH—)—NH— (H)
wherein —N—R(N—)—N— is selected from the group consisting of
5. A method of preparing the cross-linked network polymer (G) according to claim 3, the method comprising an addition reaction of trivinyl posphine oxide (E)

-continued

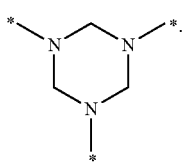

6. A method of preparing the cross-linked network polymer (J) according to claim 3, the method comprising an addition reaction of a divinyl posphine oxide (K)

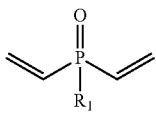 (K)

and an amine compound (H) containing three secondary amine groups according to

—HN—R(NH—)—NH— (H)

wherein —N—R(N—)—N— is selected from the group consisting of

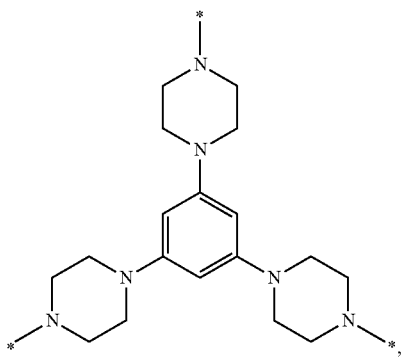

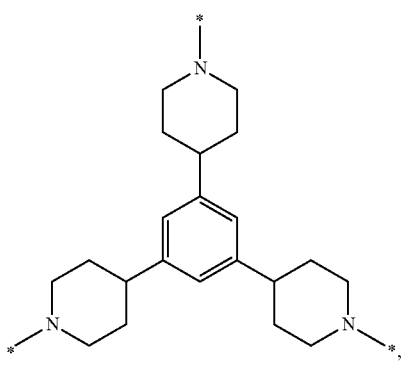

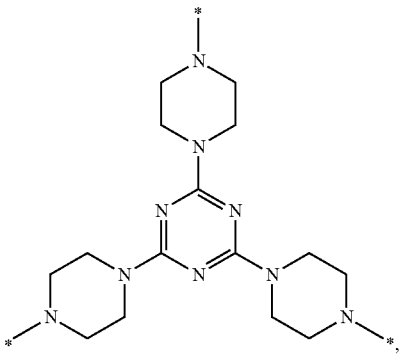

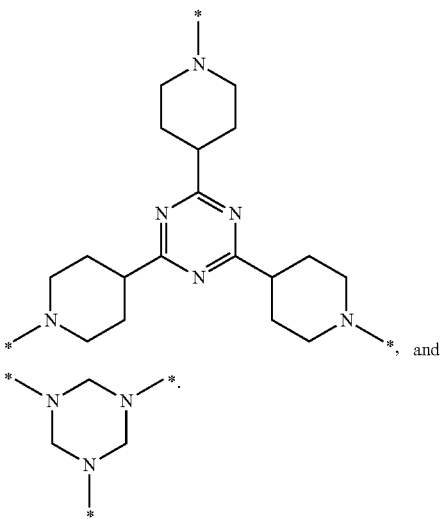, and

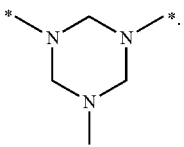

7. A phosphorus containing hydrogel or organogel, comprising the cross-linked network polymer according to claim 3 in water or in an organic solvent.

8. The method according to claim 2, wherein the method is carried out during thermal processing of a blend comprising a thermoplastic base polymer and an admixture of:
the posphine oxide (B) containing at least two vinyl groups; and
an amine compound (C) containing the at least two secondary amine groups.

9. The method according to claim 8, wherein the thermoplastic base polymer is a polyamide, polyolefin, polyester or polycarbonate.

10. A method for retarding flames comprising providing a composition comprising the phosphorus containing cross-linked network polymer according to claim 3, applying the composition to a flame and retarding the flame.

11. A polymeric material with improved flame resistance, comprising the phosphorus containing cross-linked network polymer according to claim 3, admixed in a melt processable polymer.

12. The method according to claim 4, wherein the method is carried out during thermal processing of a blend comprising a thermoplastic base polymer and an admixture of:
the posphine oxide (E) containing at least two vinyl groups; and
the amine compound (F) containing at least two secondary amine groups.

13. The method according to claim 5, wherein the method is carried out during thermal processing of a blend comprising a thermoplastic base polymer and an admixture of:

the posphine oxide (E) containing at least two vinyl groups; and the amine compound (H) containing at least two secondary amine groups.

14. The method according to claim 6, wherein the method is carried out during thermal processing of a blend comprising a thermoplastic base polymer and an admixture of:

the posphine oxide (K) containing at least two vinyl groups; and the amine compound (H) containing at least two secondary amine groups.

* * * * *